US007284202B1

(12) United States Patent
Zenith

(10) Patent No.: US 7,284,202 B1
(45) Date of Patent: Oct. 16, 2007

(54) INTERACTIVE MULTI MEDIA USER INTERFACE USING AFFINITY BASED CATEGORIZATION

(75) Inventor: Steven Ericsson Zenith, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/504,327

(22) Filed: Feb. 14, 2000

Related U.S. Application Data

(63) Continuation-in-part of application No. 09/415,956, filed on Oct. 8, 1999.

(60) Provisional application No. 60/103,765, filed on Oct. 9, 1998.

(51) Int. Cl.
*G06F 3/048* (2006.01)
*H04N 5/445* (2006.01)

(52) U.S. Cl. .................. 715/744; 715/717; 715/721; 715/759; 715/706; 725/45; 725/46; 725/39; 725/61

(58) Field of Classification Search ............. 345/744, 345/717, 721, 706, 839, 846, 962, 745, 747, 345/719, 720; 707/512, 500.1, 501.1, 104.1; 725/44, 45, 46, 47, 34, 39, 61; 705/14; 715/744, 715/717, 721, 706, 839, 846, 962, 745, 747, 715/719, 720, 512, 500.1, 501.1
See application file for complete search history.

(56) References Cited

U.S. PATENT DOCUMENTS

| | | | | |
|---|---|---|---|---|
| 5,745,710 A | * | 4/1998 | Clanton et al. ......... | 715/721 X |
| 5,799,298 A | * | 8/1998 | Bingham et al. ....... | 345/839 X |
| 5,890,152 A | * | 3/1999 | Rapaport et al. ..... | 707/501.1 X |
| 6,088,722 A | * | 7/2000 | Herz et al. ................ | 725/46 X |
| 6,134,532 A | * | 10/2000 | Lazarus et al. .............. | 705/14 |
| 6,405,206 B1 | * | 6/2002 | Kayahara ............. | 707/104.1 X |
| 6,434,747 B1 | * | 8/2002 | Khoo et al. ................... | 725/46 |
| 7,185,355 B1 | * | 2/2007 | Ellis et al. ................... | 725/46 |

\* cited by examiner

*Primary Examiner*—Raymond J. Bayerl
(74) *Attorney, Agent, or Firm*—Workman Nydegger

(57) ABSTRACT

Computing devices capable of internetworking and receiving, storing and viewing programmed (scheduled) television and multimedia content provide a platform for access to a combination of Internet and Television content and services. On this platform, a mix of pre-scripted and live interactive dialog (chat with offered responses) are broadcast by a connected server or servers to provide supplemental entertainment, information regarding programmed content, enhancements to scheduled television advertising, a community experience, and an interface to Internet applications and services. The dialog provides a "Social Interface" allowing fictional and non-fictional characters to interact with viewers. The fictional and non-fictional characters are each emblematic of a specific affinity group categorization, which a user personally identifies with and is drawn to. Selection of an affinity character also provides a filter for selecting internet and broadcast content associated with that character. Second level content is also associated with and mediated by each character. This provides e-commerce opportunities whereby sponsors can direct advertising content based upon factors such as the relative popularity of each character or the demographic group associated with each character.

15 Claims, 12 Drawing Sheets

Future Radio System Architecture

Future Radio Server Architecture

FUTURE RADIO CLIENT ARCHITECTURE
(MSTV PLATFORM)

Client Architecture Internal

INTERACTIVE MULTI MEDIA USER INTERFACE USING AFFINITY BASED CATEGORIZATION

RELATED APPLICATION

This application is a continuation in part of U.S. Ser. No. 09/415,956, filed Oct. 8, 1999, entitled A SOCIAL INTERFACE FOR INTERNET/TELEVISION, which is based on a provisional patent application No. 60/103,765, filed Oct. 9, 1998.

BACKGROUND

The field of the invention is related generally to computing devices; internetworking, television, television-based entertainment (including prerecorded, recorded on request, and live broadcast television viewing); the Internet and television broadcast services (including over-air broadcast, cable and satellite television systems). More particularly, the field of the invention relates to an interactive multi media user interface (MMUI), which interacts with a user and conveys information through affinity character based presentation of Internet and broadcast media based content and is capable of aggregating second level content including ecommerce opportunities.

The number of homes, businesses and individuals using personal and portable computing devices has increased substantially. The Internet has become pervasive. Television is evolving into an enhanced experience where broadcast and scheduled programming can be supplemented with interactive components (typically using Internet related technologies such as HTML, JavaScript, et. al.). The development of standards (such as ATVEF—Advanced Television Enhancement Forum—ATSC DASE, and Europe's DVB) to allow these Internet technologies to synchronize the presentation of their content and software activities with traditional and non-traditional broadcast content permits the construction of a new generation of applications.

Chat has been a very popular medium at various online services (notably on the open Internet IRC networks such as Undernet and at services like AOL and Yahoo!) used as a mechanism for ad hoc communication between individuals.

The invention of a method for chat interaction using a simple television remote control—Click Chat™ (Zenith, U.S. Pat. No. 6,519,771, issued Feb. 11, 2003)—which allows viewers in command of a conventional television remote control or other simple selection device to respond to dialog without requiring the use of a keyboard. As the dialog proceeds, senders can incorporate optional responses into the chat stream using a simple encoding. Viewers can customize their own responses to arbitrary questions, statements or exclamations. These viewer-defined responses are offered to the viewer when the Click Chat™ system identifies a question, statement or exclamation in the chat system (in the simplest case by the detection of a query [?], period [.], or exclamation mark [!] in the incoming chat stream).

TV Chat™ is designed to support chat-based applications on the Microsoft Web TV® platform provides the client platform to enable the current invention (and the embodiments of the invention known internally as Chattercast™ and Future Radio™—please note that TV Chat™, ClickChat™, Chattercast™ and Future Radio™ are trademarks of PEAR AVENUE, INC. formerly known as The Kiss Principle, Inc.). Chattercast™ is a more conventional chat experience where pre-scripted dialog is used to hide connection latency and connection state, to provide the viewer, in a mix of live and scripted dialog, with a seamless contextual dialog experience concurrent to television viewing, and to enhance advertising. Future Radio™ is a fuller embodiment of the invention, including a universe of characters that not only entertain and inform as they communicate with the viewer but also are able to provide an interface to applications and services.

The presentation of information regarding programmed content (television shows and internet events), guidance through and supplemental enhancement of content (including advertising), messaging, online banking, educational applications, e-commerce, are among the applications and services that can be represented by the interface. Traditionally, information regarding programmed content has been available through an "Electronic Programming Guide." Interfaces to messaging applications, online banking, educational applications, e-commerce and so forth have been static and driven by functional forms and so-called "dialog boxes." Future interfaces, if our vision is fulfilled, will be more entertaining and transactions with the interface will be contextual conversations.

Four primary communication architectures are evolving in the industry upon which the current invention can be delivered. The first is the architecture represented by the first Web TV Plus® deployments (please note that Web TV® is a registered trademark of Microsoft Corporation). This architecture combines an Internet client with a slow connection via a telephony modem with hardware that permits the reception of Television broadcasts in which ATVEF triggers are present. The second architecture is an extension of the first and permits the client to also receive broadband broadcasts of data (typically via satellite). The third architecture is broadband—i.e., a fast connection in both directions. The fourth architecture is wireless (permitting mobility).

These communication architectures are complicated by the storage architecture of the clients. All clients enjoy a limited amount of random access memory (ROM, RAM and FLASH) while some also carry a mass storage device such as a hard disk. We use different strategies (described in detail later) to ensure the availability of dialog depending on the combination of communication and client storage architecture.

In our invention, we are concerned with two characteristics of these communication architectures, connection state and latency. Connection state is whether a network connection is established by the client. Latency is the time required to complete the delivery of a required communication.

The goal of our methods is to provide the viewer with a continuous, instant-on, dialog experience. High latency and a disconnected state are hidden, to the degree possible, from the viewer.

Social Interfaces are a recent innovation (Nass and Reeves, "The Media Equation: How People Treat Computers, Television, and New Media Like Real People and Places", 1996, Cambridge Univ. Pr.; ISBN: 1575860538) but several attempts to implement social Interfaces have failed to prove effective (e.g., Microsoft's "Bob"). A fundamental problem facing attempts to build social interfaces for computing devices in the past has been how to make the interface compelling enough that the user will return habitually to the interface.

In the Future Radio™ service we add depth to the social interface by providing a unique and evolving fictional universe in which the social characters of the interface "dwell" and interact. This enables us to provide the viewer with a set of characters that cover personality types (dominant, submissive, friendly and unfriendly) and affinity groupings.

Our categorization method (i.e., the means by which we collate and present data in the dialog) is affinity based. Developing a character or live personality in our universe that appeals to seniors or alternatively a teen sports fan helps us determine what information, applications and services to present to classes of viewers and how to make that presentation.

Interface development remains plagued by the vagaries and talent of skilled human writers to provide compelling and stimulating dialog. However, in our invention, writers are directed toward the development of characters that prove most successful as a social interface.

AI and its branch Natural Language was an attempt a decade ago to build parsers that were English grammar based. A few products were produced that provided "English" interfaces to a variety of computer applications. The hope was that communication with computers would become simplified and easy enough for the common computer illiterate person to more easily use the computer. These all failed to bring the desired results. The reasons are not well understood. Interfaces have improved in the last decade to the current point and click Graphical User Interfaces (GUI) provided by MS Windows, Macintosh OS and others. On the TV side, we see the immergence of Web TV browser interfaces. With the merging of TV with PC and Internet, we are again at a crossroads on how best to design a "human" interface with this new technology.

The interfaces designed so far have primarily been designed from the standpoint of conventions established in the origins of computer design. These conventions do not readily apply when the interface is presented to a broader population of individuals unfamiliar with the conventions or unsuited to the methodologies. Early interface idioms were not designed for access by a population with diverse educational and economic backgrounds.

There is a similarity in the way the computer and the human mind work which is why "friendly" interfaces have been so hard to design and so long in coming. The interfaces thus far have been designed from the computer standpoint so that data that is stored in various forms can be sorted and retrieved. While the computer can retrieve only that which it has been fed, the human mind can not only retrieve whole sentences, but also can reconstruct them as it pleases, gild the words with emotion and play back the words with lyrical sound and oratorical fury, calling into service the entire body to support the words. It can cause the hands and arms to provide appropriate gestures, the face to take on the correct expression, the eyes to gleam in sync with the message being delivered and it can do this all on the fly, automatically. Thus, the presentation of the information can frequently be more important than the actual substance of the information. It is the presentation that focuses, maintains our attention. TV commercials attempt to draw immediate attention through the increase in sound volume, a cheap mechanism to obtain user attention. It is the fluctuation of sound volume and intensity, tone of voice, personal quirks and gestures, characteristic pauses or speaker delivery techniques and antics that keep us absorbed and interested in media content.

All interfaces today are devoid of emotional content yet there is a real need and even an attempt by users to embed the emotions into their content. Users react positively when they receive even token emotional content back in messages, even in its current weak attempts to transmit an emotional message. Each of us has seen a :) inside text to demark an attempt to jest or joke. An exclamation mark ! or BOLD letters to represent enthusiasm or danger. Information flow is not maximized by coming through in complete grammatically correct sentence structures. Information flow is maximized when it makes an impact on users. This can come in fits and starts, sot and loud, by head scratching and pausing, iambic rhythm, cadence or tempo. These are just some of the methods we use to convey emotion. It is this transmission of emotional content that is totally missing from current interfaces.

Most of us at one time or another have toiled trying to teach a child something that we thought was important and were frustrated when the child lost interest and turned off and quit. Later, much to our amazement, the child was effortlessly using this knowledge as if it were second nature. We may have learned that a "friend showed me how to do it." Why is that and how did it happen we may ask. The answer is that a friend imparted that knowledge, albeit less precisely than you may have, in a way much less threatening to the child, perhaps more interesting but in all cases more efficient than you could have. Essentially this learning took place via a friendly, hence more efficient, user interface. Teaching and learning is still an art form. Tolstoy's firm belief was that art is the transmission of feelings. We have yet to learn how to do that in an interface, until now.

Comfort Level

Interfaces have to be learned, they are not natural. "Natural Language" technology proved unnatural to most people. Most people have an aversion to technology because they are not "comfortable" with the interface or the forced designed in which they must interact. Interfaces can make or break an otherwise very good and useful technology. The design of any good interface starts with understanding of the end user. This begins with the attempt to ease the learning of the functionality of the technology and how to interact with it, thus the more comfortable a user is with the interface, the quicker they learn to use the technology and be proficient. Not just proficient, but to enjoy, obtain satisfaction from and master. For this reason, most tutorials start out very simple and progress to the more difficult in stages.

Where there is encouragement, commiseration, laughter, entertainment, there is enjoyment, sustained participation, concentrated effort and maintenance of user attention. What is needed is a way to embed encouragement, commiseration, laughter and in short the full gamut of emotional content into an interface to extend the dimension of mind as well as of sight and sound.

All prior art interfaces are devoid of emotional content in presentation of information. Emotional content integrated with other content infuses users with knowledge they are striving to obtain through an interaction that the user can obtain it understand and internalize it. It is the emotional and personal element that captures and holds the user's attention and is the mechanism used to immerse the user in the interaction with the multi media user interface (MMUI). Prior art has limited access to and limited ways of presenting emotional content. In contrast, the invention MMUI engages the user in the type of emotional or personal interaction they are seeking to develop knowledge or entertain them by providing a virtual relationship with one or more affinity characters.

What is needed is the infusion of emotional energy to convey knowledge from Internet and media space content presented in the form of the user's own choosing. This mechanism may be in the form of a character provided from a list of a variety of celebrity, historical, personalities, stereotypical caricatures and the like, figures, that bring with them not only a domain of knowledge, but culture, mannerisms, attributes, method of speaking, personality, presentation techniques, etc., which a user can be comfortable with in interacting with TV and PC technology. Thus the integration of the media content with the presentation from a personality or character of a user's choice will contain the substance and emotional content that is missing from conventional GUIs. Emotional content can contain and convey the subliminal messages, which are vital to a user's interaction with a MMUI. The addition of emotional content captures, maintains, and focuses a user's interest. This emotional content comes through from the affinity character chosen by the user to deliver what ever it is the user is interested in.

Consumer Behavior Data Collection

Present interfaces raise substantial privacy issues. These include gathering information on the users under the guise of the need to learn how best to present the user with opportunities relevant or of interest to the user quicker. This leads to implementation of extensive database record keeping and constitutes a severe invasion of privacy depending on the depth and detail of dossier kept on individuals. By choosing a character affiliated with a body of knowledge or a particular personality, a user defines their possible likes, dislikes, interests, needs, market segments, purchasing behavior, specific affinity groups, behavior associations and more. These are unobtrusive means by which a user's potential needs and requirements can be better and more efficiently discovered and served. What are needed are unobtrusive methods by which we can identify user's preferences and needs.

User Friendly MMUI

What is needed is a new multimedia user interface (MMUI) that is capable of integrating broadcast and internet content and mediating that content in a user friendly fashion. The MMUI also should provide a new and more effective means for scanning the enormous quantity of broadcast content and internet information and programs and must be able to filter that content to provide each viewer with selected and specialized content of interest to an individual viewer.

What is also needed is a new MMUI which provides a user friendly way for a viewer to select content of particular interest and at the same time enable the program sponsors, internet service providers and other media advertisers to target specific audiences with advertising content tailored to the preferences of that audience.

It would be desirable to provide a user friendly MMUI with a way to automatically segregate viewers into affinity groups with the like preferences as this would greatly streamline content scanning and filtering of information. With reference to a well-known character, like Buzz Light-Year® from the popular motion picture Toy Story® (trademarks of Pixar Inc.), it would be more entertaining, stimulating, and easier to focus attention on a subject such as cosmology mediated and presented through the character of Buzz Light-Year®. Content would be filtered somewhat to correspond with Buzz's vocabulary and presented in his ebullient, overbearing comical manner. Without a doubt a Buzz Light-Year® or Albert Einstein will maintain the attention and focus of a viewer and all the while transferring wanted information in an entreating way.

A person interested in financial investment may prefer presentation through an investor personality such as Louis Rukeyser, Bob Brinker or the like, depending on the area of interest or personality preferred. Content is immersive because a user is conversing with a character he finds interesting, stimulating and or provocative. This "conversation" takes place with a character on the multi media device through a variety of dimensions, those being visual, audio and emotional. The mechanisms for visual and audio are well known, but the emotional dimension is carried via the character, the character's attributes and delivery style. These together provide immersion in the media interface.

What is needed is an affinity group character interface with enables a user to identify with a character and affinity group such that a virtual relationship between the user and character can develop and grow over time. A user can access information that is most relevant to the user, at his option via an interface which represents the user's affinity interests. A virtual relationship grows between the user and affinity group character. The user can interact with the character representative of the user's selected affinity group, thereby facilitating the transfer of information.

SUMMARY OF THE INVENTION

In addition to the pre-scripted interface referred to as infra, a MMUI is provided, which comprises a plurality of characters, each character being emblematic of a specific affinity group that a user identifies with or is drawn to. In this method of interacting, the user selects an affinity-based character, which commands a domain or body of broadcast media or Internet content. This content can be recalled, selected, translated and presented to a user in the format of that particular character's presentation style.

Another aspect of the invention provides e-commerce applications, since an affinity based character "guide" is capable of merging broadcast media with internet business opportunities by filtering second level or sponsor/commercial content through user's preferences or user's choices based on knowledge about the user's selected character based affinity group. The character conveys content from a plurality of secondary information sources selected and filtered through character's affinity group to the user via a virtual relationship.

Viewers watch and listen to audio and video entertainment and informational programming using a multiplicity of individual enhanced television devices. These enhanced devices (clients) include computers with television tuners, games machines, portable enhanced television devices, enhanced recording devices, and televisions enhanced with "set-top-box" devices supporting an enhanced TV standard (e.g., ATVEF) or any similar capability for the display and presentation of content concurrent to an audio/video viewing capability. These devices are connected either permanently or intermittently to a network such as the Internet. Each client contains some amount of data storage implemented by software, memory and/or other Mass Storage Device.

The client and network architecture includes clients infrequently connected to the network (such as via wireless or telephony modem), mobile devices (such as those cellular telephones and PDAs), clients permanently connected to the network (such as via Ethernet or cable modem), clients able to receive broadcast data (such as via satellite or other wireless broadcast) connected also via a "narrow band" back channel, and any combination of the forgoing with more or less data storage.

A set of servers provides sources of data and services (including a transient and permanent storage service) to the clients over these network architectures. In particular, these sources include a system for the delivery of formatted media (such as ATVEF), a system capable of providing support for scheduled and unscheduled synchronization of data with the clients, and a system capable of delivering a real-time text, or audio, or audio/video chat stream. These sources can optionally include a system capable of providing deferred short messaging support, a database system containing information such as a viewer's identity and characteristics of value for or about the viewer, a database system containing content programming data and other information (about television or otherwise), a system capable of providing any other application (such as email messaging) or service (such as online banking).

A production service produces chat dialog for delivery to the clients that is contextual to programmed content, can provide information about programming, and/or is scripted to provide an interface to the other services available.

Concurrent to the entertainment and information client devices present, a user interacts with the text, audio, or audio/video chat stream. Dialog is overlaid on the primary content or is displayed alongside the primary content. The chat stream provides supplemental entertainment and information programming and acts as an interface to available applications and services.

Pre-scripted dialog (in the form of authored interactive transcripts) is delivered to the clients ahead of play back, delivered immediately prior to requirements or delivered on demand.

Pre-scripted dialog is triggered by time scheduled play back, trigger events attached to the content being viewed by the viewer (for example, using ATVEF triggers), or in response to an interaction with the viewer. To provide the viewer with a continuous and instant-on dialog experience pre-scripted dialog is played to hide the connection state and high communication latency.

Viewer's responses to chat dialog are delivered in real-time or are deferred for subsequent delivery. For example, if the viewer's client is disconnected a response can be collected by the client and delivery deferred until the client next connects or participates in a scheduled synchronization with the service. Viewer responses are also deferred when a viewer is connected, for example, if the response is prompted by a broadcast response request (say to an advertisement) then, to avoid high traffic spikes on the network, the response is deferred.

The pre-scripted dialog is associated with (contextual to) content, service or application. The pre-scripted dialog can refer to and provide information pertaining to programmed content (subsuming or supplementing the role of a conventional entertainment programming guide—EPG). The pre-scripted dialog can refer the viewer to other content; provide links or reminders to other available programmed content—for example, while watching one television program the dialog can refer the viewer to other content. The dialog may similarly capture a response from the viewer that expresses an interest in later viewing of supplemental content; permitting the dialog to present supporting material in subsequent interaction with the viewer (either during the same "session" of interaction or in subsequent "sessions").

The pre-scripted dialog provides support to programmed advertising and product placement—for example, offering to purchase or provide additional information on an advertised product or service on a user's behalf (thus acting as the viewer's agent). The dialog also provides notifications of events of interest to the viewer—these events include notification of the new availability of programmed content (e.g., the start of a television program), incoming email, availability of an offer for a product the viewer has expressed an interest in (acting upon the viewer's personal preferences).

Where content viewing is deferred (recorded—in products such as TiVo or Replay), the dialog is similarly deferred. Real-time chat runs concurrent to the pre-scripted dialog and is available subject to the timing and availability of a real-time connection. Real-time connections are scheduled by an encoding in the pre-scripted dialog stream.

Pre-scripted dialog is fixed or variable. A richer experience is provided if the pre-scripted dialog stream provides multiple paths. For example, pre-scripted dialog should vary when viewing repeat showings of content. A client records the path taken through a previous viewing to avoid repetition. The pre-scripted and real-time dialog mix to form a single experience that is conversational in nature. Pre-scripted dialog hides connection latency and connection state.

BRIEF DESCRIPTION OF THE DRAWINGS

The present invention is illustrated by way of example and not limitation in the figures of the accompanying drawings, in which like references indicate similar element and live chat servers in accordance with an aspect of the invention.

DETAILED DESCRIPTION

Figure 1:
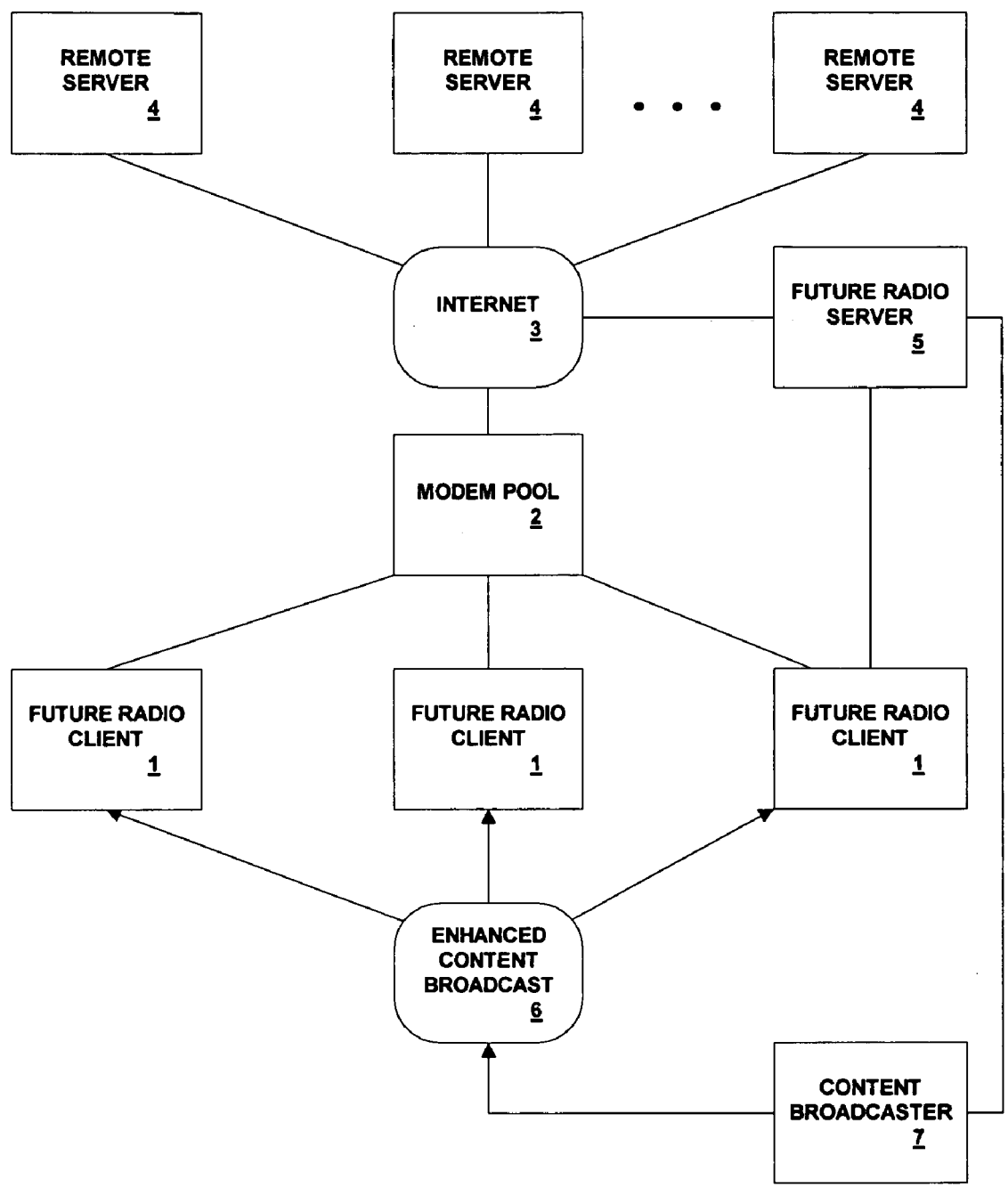
FIG. 1 illustrates several Future Radio™ clients connected to a Future Radio™ server system and enhanced content broadcasts in accordance with an aspect of the invention.
Figure 2:
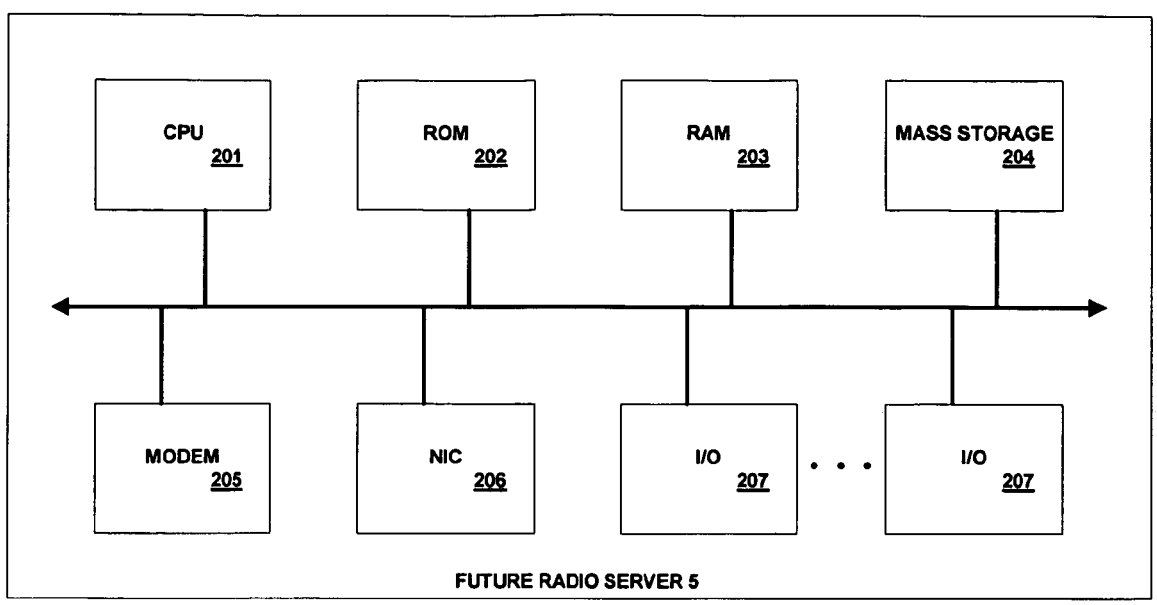
FIG. 2 illustrates a Future Radio™ server architecture in accordance with an aspect of the invention.

A method and apparatus for delivering a social interface over a network, supplemental to and concurrent with television (or any similarly broadcast content) are described in the following description, for the purpose of explanation; numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description.

In one embodiment, steps according to the present invention are embodied in machine-executable software instructions, and the present invention is carried out in a processor executing the instructions, as will be described in detail below. In other embodiments, hardwired circuitry may be used in place of, or in combination with, software instructions to implement the present invention.

An aspect of the present invention relates to a system in which a computing device is integrated with an enhanced television receiver and display (client) and is connected to one or more servers over a network (such as the Internet). The client includes a processing system that executes browser software, integrates broadcast media and enhanced television features. As will be described below, the client provides a platform to deliver an interactive dialog (chat) interface for viewers (a.k.a. users) that provides supplemental entertainment, information regarding content (programmed and otherwise), enhancements to advertising, a community experience, and an interface to applications on the clients and available by access to the Internet and television broadcast services.

In one embodiment, an aspect of the present invention is implemented as a system known as Future Radio™ on a platform known as Microsoft TV Pak® with TV Chat™ and Chattercast™ (please note that Microsoft TV® and Microsoft TV Pak® are registered trademarks of Microsoft Corporation). Microsoft TV Pak® uses a standard television display to view enhanced television. Microsoft TV Pak® permits the construction of consumer electronic devices supporting enhanced television standards. TV Chat™ and Chattercast™ are TV Pak® applications that permit the presentation of chat (TV Chat™) and the playback of parameterized pre-scripted dialog (Chattercast™). The Microsoft TV Pak® client permits television broadcasts to be overlaid with HTML and JavaScript functionality, for triggers (references to JavaScript functions) embedded in the broadcast television signal to be received. TV Chat™ manages the network connection to a chat server and permits real-time chat dialog and Chattercast™ permits parameterized pre-scripted chat dialog to be displayed using the TV Pak® client.

The Future Radio™ client is implemented as an application written in HTML and JavaScript, it uses the API (Application Program Interface) provided by Chattercast™, TV Chat™ and the Internet to make connections to Future Radio™ servers, receive chat and playback pre-scripted dialog. Triggers embedded in the broadcast content synchronize and coordinate dialog with content. In accordance with the present invention, a viewer of a Microsoft TV Pak® client with TV Chat™ and Chattercast™ can use Future Radio™ network applications and services provided by one or more remote Future Radio™ servers. The Future Radio™ network services are used in conjunction with software running of the Microsoft TV® client system to provide, through an evolving dialog, supplemental entertainment, information regarding programmed content (television shows and internet events), guidance through and supplemental enhancement of content (including advertising). The evolving dialog provides an interface to applications such as messaging services, inline banking services, educational applications, and e-commerce. The evolving dialog incorporates notifications of various kinds. Dialog enhancements, applications and services are coordinated in the context of broadcast content that contains triggers to direct the course of the dialog. Dialog is also directed by interaction with the viewer.

System Overview

FIG. 1 illustrates a configuration of the Future Radio™ network according to one embodiment. A number of clients 1 are coupled to a modem pool 2 via a direct-dial, bi-directional data connections 306a, 306b, which may be Telephone, ISDN, DSL, Cable, Wireless or any other similar type of connection. The modem pool 2 is coupled typically through a router, such as that conventional known in the art, to a number of remote servers 4 via a conventional network infrastructure 3, such as the Internet. The Future Radio™ system also includes a Future Radio™ server 5 that specifically supports the Future Radio™ application running on the clients; i.e., the server 5 provides the Future Radio™ service to the Future Radio™ clients, Each of the clients 1 can connect to the server 5 through direct connections via telephone or similar direct connection capability or through the Internet via the modem pool 2. The modem pool 2 is a conventional modem pool, such as those found today throughout the world providing access to the Internet, and private networks, and may be provided by a local Internet Service Provider (ISP).

The Future Radio™ server 5 provides bi-directional access to a content broadcast 7 typically a cable head end, such as that conventionally known in the art. The server 5 provides the content broadcaster 7 the Future Radio™ service for transmission to the clients 1 over the enhanced content broadcast 6 typically a cable network, terrestrial broadcast, or satellite broadcast. The Future Radio™ service is integrated with broadcast content 6 using an enhanced television standard. In this embodiment, that standard is provided by the Advanced Television Enhancement Forum (ATVEF) that permits the embedding of triggers in the broadcast 6 by the content broadcaster. Such triggers are incorporated in either real-time by the content broadcaster 7 or are added in advance to content during postproduction of the broadcast content. Triggers in this embodiment take the form of calls to JavaScript function calls to functions defined and executed on the clients 1, the Future Radio™ application running on the clients 1 display and otherwise present interactive transcript and live dialog to viewers.

Server System Architecture

The Future Radio™ server 5 generally includes one or more computer systems generally having the architecture illustrated in FIG. 1. The illustrated architecture is only exemplary; a Future Radio™ server is not constrained to the illustrated architecture (for example, the architecture can be a more distributed system than illustrated here). The illustrated architecture includes a central processing unit (CPU) 201, random access memory (RAM) 203, read-only memory (ROM) 202, a mass storage device 204, a modem 205, a network interface card (NIC) 206, and various other input/output devices 207. Mass storage device 204 include magnetic, optical or other equivalent storage medium. I/O devices 207 include any or all devices such as a display monitor, keyboard, cursor control device, etc. Modem 205 is used to communicate data to and from remote servers 4.

As noted above, the server 5 may actually comprise multiple physical and logical devices connected through distributed system architecture. Accordingly, NIC 206 is used to provide data communication with other devices that are a part of the Future Radio™ service.

Figure 8:
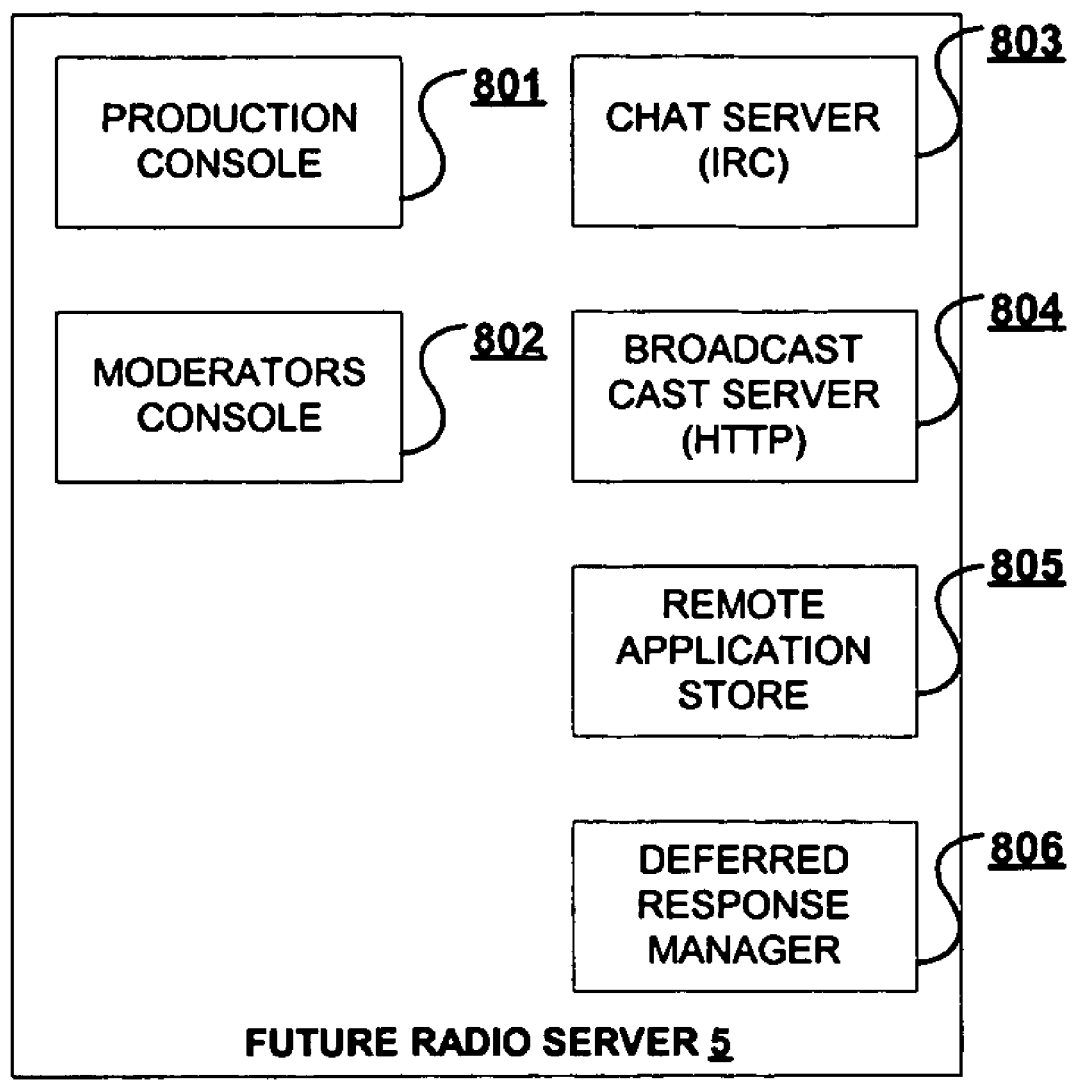
FIG. 8 is a block diagram that illustrates the functional components of the Future Radio™ server in accordance with an aspect of the invention.

FIG. 8 illustrates a Future Radio™ server 5 and the application services provided to deliver live and pre-scripted transcripts (described in detail below) to the clients 1. Server 5 provides a synchronized remote application store 805 that is periodically accessed by the clients 1 to update the local store 501, 502. Transcripts are produced (written) and managed from the production console 801 and placed in the remote application store 805 for delivery to the client's 1 local store 501. Transcripts are also provided by the production console 801 to the IRC chat server 803 for live delivery to clients 1 and to the broadcast chat server 804 for on-demand delivery to the clients 1.

As noted previously, the Future Radio™ service is integrated with broadcast content 6 using the triggers specified by an enhanced television standard. The specification of those triggers—exactly what the trigger does, which content to include the triggers in, and precisely where in the content to include them—is specified by the Future Radio™ production team. That team uses production console 801 (that may consist of multiple workstations attached to the server 5) and stored on the broadcast server 804 for on-demand delivery to the content broadcaster 7 or the offline content postproduction team that may receive the trigger specification by any means—including land mail.

A deferred response manager 806 gathers and processes responses that arrive at the remote application store 805 from the clients 1 during the previously mentioned client update of the remote application store 805. For example, a viewer may have made a response to a transcript associated with an advertisement during the course of their television viewing. If the client box 303 were not connected at that time to the Future Radio™ server 5 the response would have been stored in the client's deferred response store 502 and subsequently have arrived at the server 5 remote application store 805 during an update. The deferred response manager propagates those responses to their target destination—in this example case the destination could be a remote server 4 maintained by the advertiser and accessible to the Future Radio™ service via the Internet 3. Similarly, the deferred response manager 806 places replies to deferred responses in the remote application store 805 for later propagation to the client.

Chat server 803 provides the live and interactive broadcast of transcripts, enabling the Future Radio™ production team using production console 801 and moderators console 802 to interact with viewers in real-time. Chat server 803 also enables viewers to exchange real-time dialog when using the TV Chat™ client of the Microsoft TV®, TV Pak®. In this embodiment, the real-time chat server 803 is typically an Internet Relay Chat (IRC) server. IRC is a standard Internet protocol for the exchange of real-time chat messages—any protocol providing similar functionality could be used.

Broadcast chat server 804 delivers transcripts on-demand to clients 1 and processes requests from the Future Radio™ clients 1 using standard web server technology known in the art.

Client System Architecture

Figure 3:
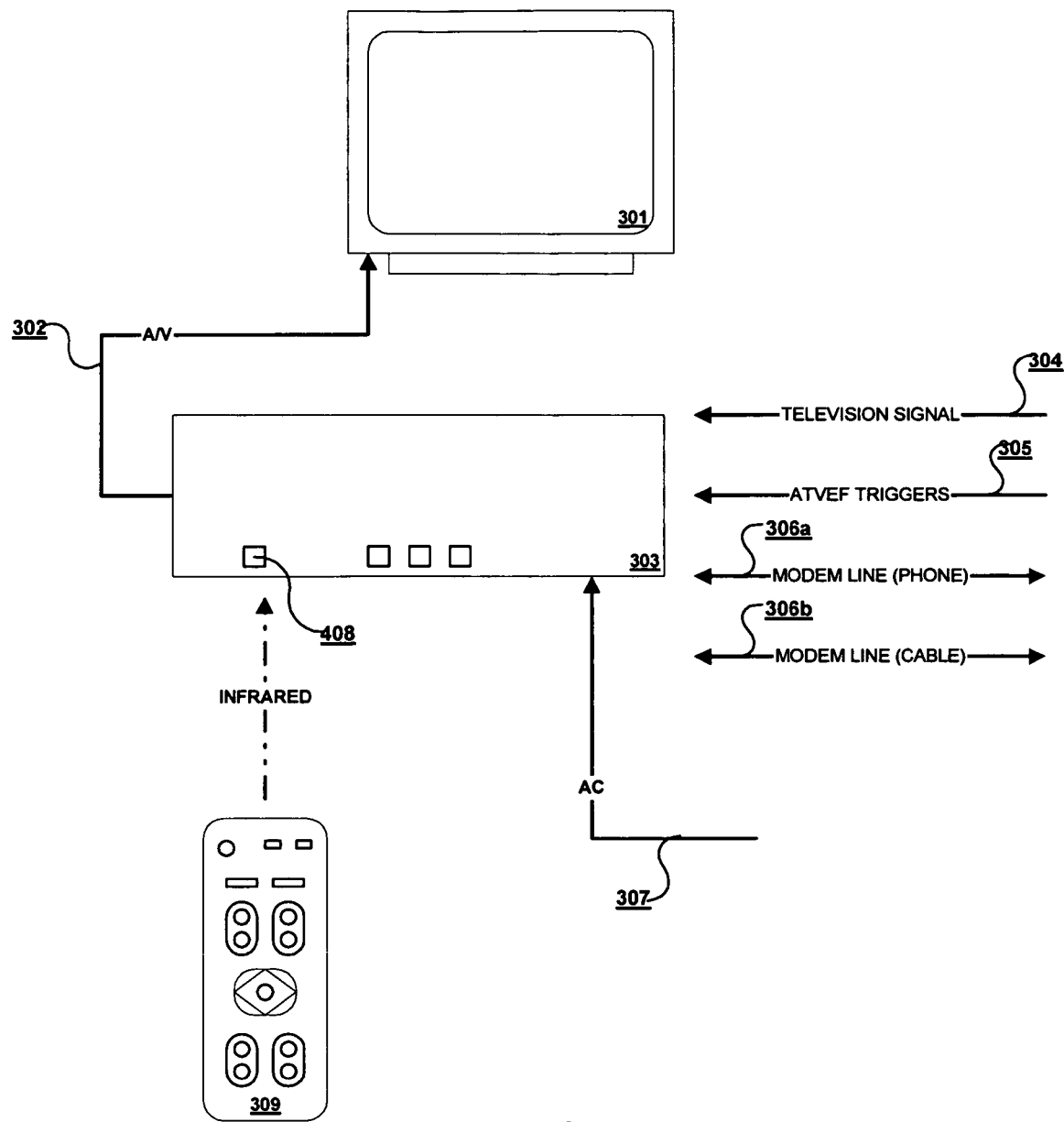
FIG. 3 illustrates a Future Radio™ client architecture based on a Microsoft TV® platform in accordance with an aspect of the invention.

FIG. 3 illustrates a Future Radio™ client system 1 according to one embodiment. The client system 1 include an electronics unit 303 (hereafter referred to as the Microsoft TV® box or the box 303), and ordinary television set 301, and a hand-held remote control 309. In an alternative embodiment to the present invention, the Microsoft TV® box 303 is built into the television set 301 as an integral unit. The box 303 includes hardware and software for providing the user with a multimedia graphical user interface that overlay or integrate alongside television content. This interface presents the Future Radio™ dialog by which the viewer can access presentation of information regarding programmed content (television shows and internet events), guidance through and supplemental enhancement of content (including advertising), messaging, online banking, educational applications, and e-commerce. The viewer can also simply view the dialog and interaction with it as supplemental entertainment.

The Future Radio™ client system 1 uses the television 301 as a multimedia display device. The box is coupled to the television set 301 by a link 302. The link 302 includes an audio channel for generating sound from the television's speaker and a video channel in the form of RF (radio frequency), S-video, composite video, or other format. The communication link 306a, 306b between box 303 and the server 5 is telephone, cable modem, or Ethernet. The box 303 receives AC (alternating current) power through and AC power line 307.

In an alternative embodiment to the present invention, the Microsoft TV® box 303 is built into television set 301 as an integral unit, and further integrated with a wireless communication link 306 and battery power in place of the AC power line 307. In this embodiment, the client is reduced size to create a portable embodiment of the invention—creating a PDA (Personal Digital Assistant) size Future Radio™ client. The software that operates Microsoft TV® (Windows CE®) is today used on a variety of hand held device as well as computing systems in motor vehicles (Auto PC). In a further alternative embodiment of the present invention, using the same technology, the Future Radio™ service is provided to clients located in motor vehicles.

Remote control 309 is operated by the viewer in order to control the client system 1 to select optional responses presented by the dialog. The Future Radio™ service includes optional responses in the dialog for presentation by Microsoft TV Pak®, TV Chat™, Click Chat™ enabling the viewer to interact with Future Radio™ services and participate in the on-going dialog (chat). The box 303 receives commands from the remote control 309 via an infrared (IR) communication link. In alternative embodiments, the link between the remote control 309 and the box 303 may be RF or any equivalent mode of transmission. Equally, the input device in alternative embodiments may be a keyboard, touch screen or other equivalent input device.

The box 303 includes other application software that, when executed by a processor on the box 303, provides the viewer with an interface (using the multimedia and graphical capabilities of the box) that provides the viewer with access to the Future Radio™ services. The application software is automatically available upon the application of power to the box 303.

Figure 4:
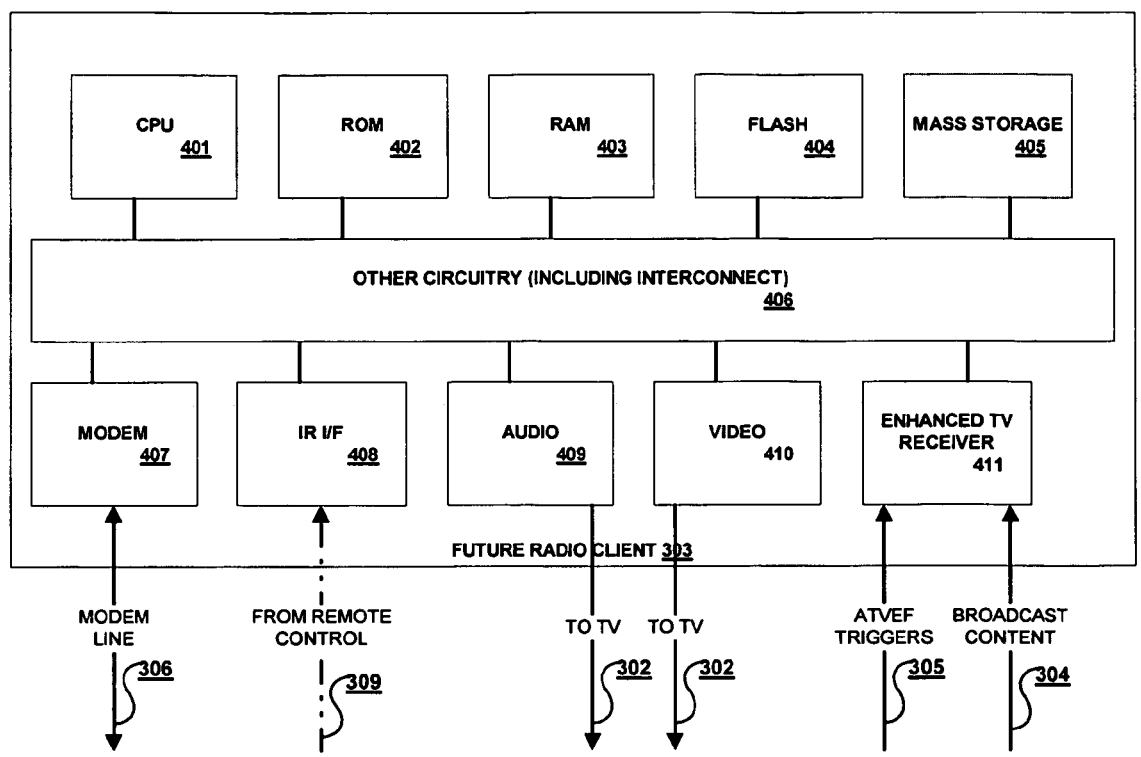
FIG. 4 is a block diagram showing the primary components of a typical client platform and its external connections in accordance with an aspect of the invention.

FIG. 4 shows the internal components of the Microsoft TV® box 303. Operation of the client system 1 is controlled by a CPU 401 that is in turn connected to other electronic circuitry 406. The CPU 401 executes software designed to implement features of the present invention. Other circuitry 406 implements the other functions of the Microsoft TV® box 303 and provides interconnection between the box components. Random Access Memory 403 provides transitory storage of executable programs and data. Flash memory 404 provides storage of certain programs and data storage. In one embodiment, a mass storage device 405 is included in the Microsoft TV® box.

Figure 5:
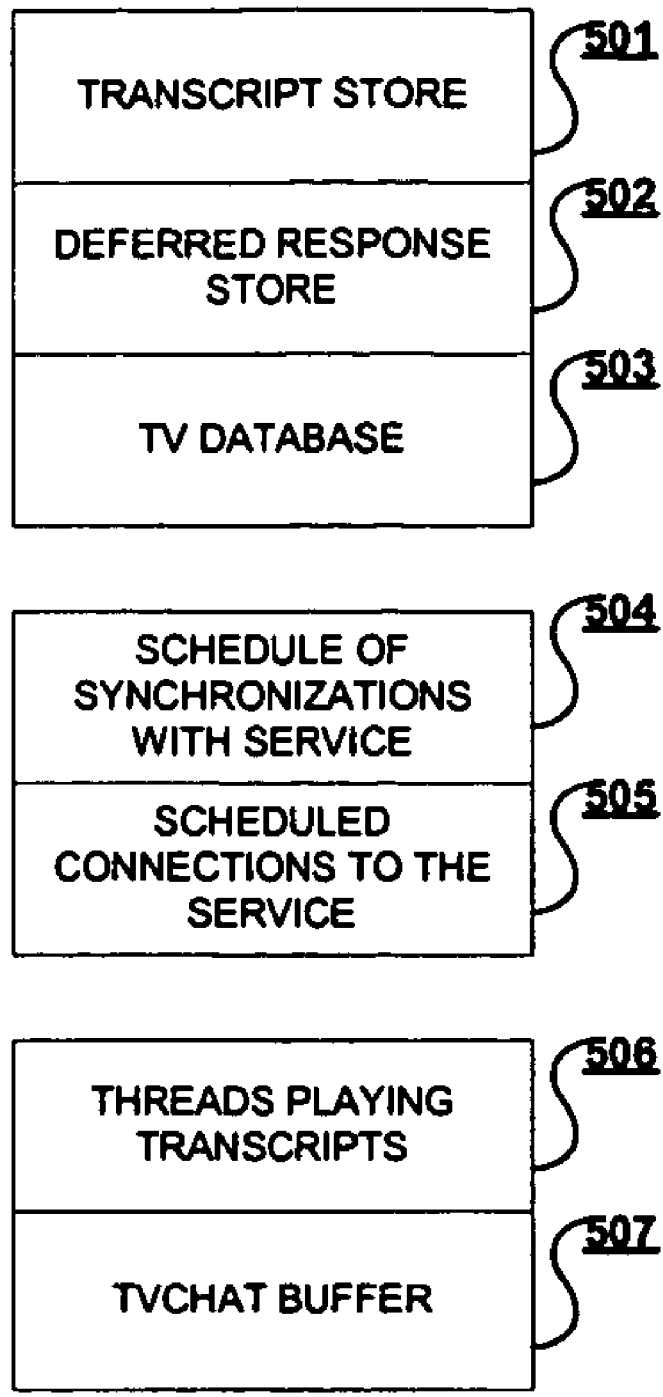
FIG. 5 illustrates the functional components of the client software in accordance with an aspect of the invention.

FIG. 5 illustrates the principle internal structures of the Future Radio™ application that runs on the client box 303. A transcript store 501 provides a local storage of transcripts on the client box 303 and is implemented in this embodiment as a Windows CE® storage partition in flash memory 404 or mass storage 405—the particular storage implementation being dependent on the specification of the particular box 303 manufacturer. Typical box 303 architecture today where the enhanced content broadcast 6 is transported over a cable television network is likely to have smaller amounts of flash memory 404 but be permanently connected by a relatively fast connection with low latency to the Internet 3 via a cable modem 407. A box 303 architecture where the enhanced content broadcast 6 is transported by a satellite broadcast is likely to have a telephony "back channel" modem 40 that is relatively slow, has high latency to establish an initial network connection the Internet 3, and provides a larger mass storage 405 capable of storing many more transcripts than when implemented in limited flash memory storage 404. The Future Radio service balances the delivery of transcripts. Boxes 303 that are permanently connected to the Internet 3 via a low latency modem 407 connection and have low storage capacity are delivered most transcripts on-demand, while boxes with high latency are delivered transcripts ahead of requirements using the remote application storage 805 noted above. In both cases however, locally stored transcripts are used to hide connection latencies; i.e., transcripts from local storage, if available, are played back while the Future Radio client attempts to initiate, re-establish, or wait for a connection to the Internet 3.

The JavaScript function calls that implement triggers embedded in the enhanced broadcast content 6 reference transcripts that are the most immediately accessible; that is, if the box 303 has a low latency connection 306 established it loads transcripts on demand from the broadcast server 804, if the connection 306 is high latency, transcripts in local store 501 are loaded.

Figure 9:
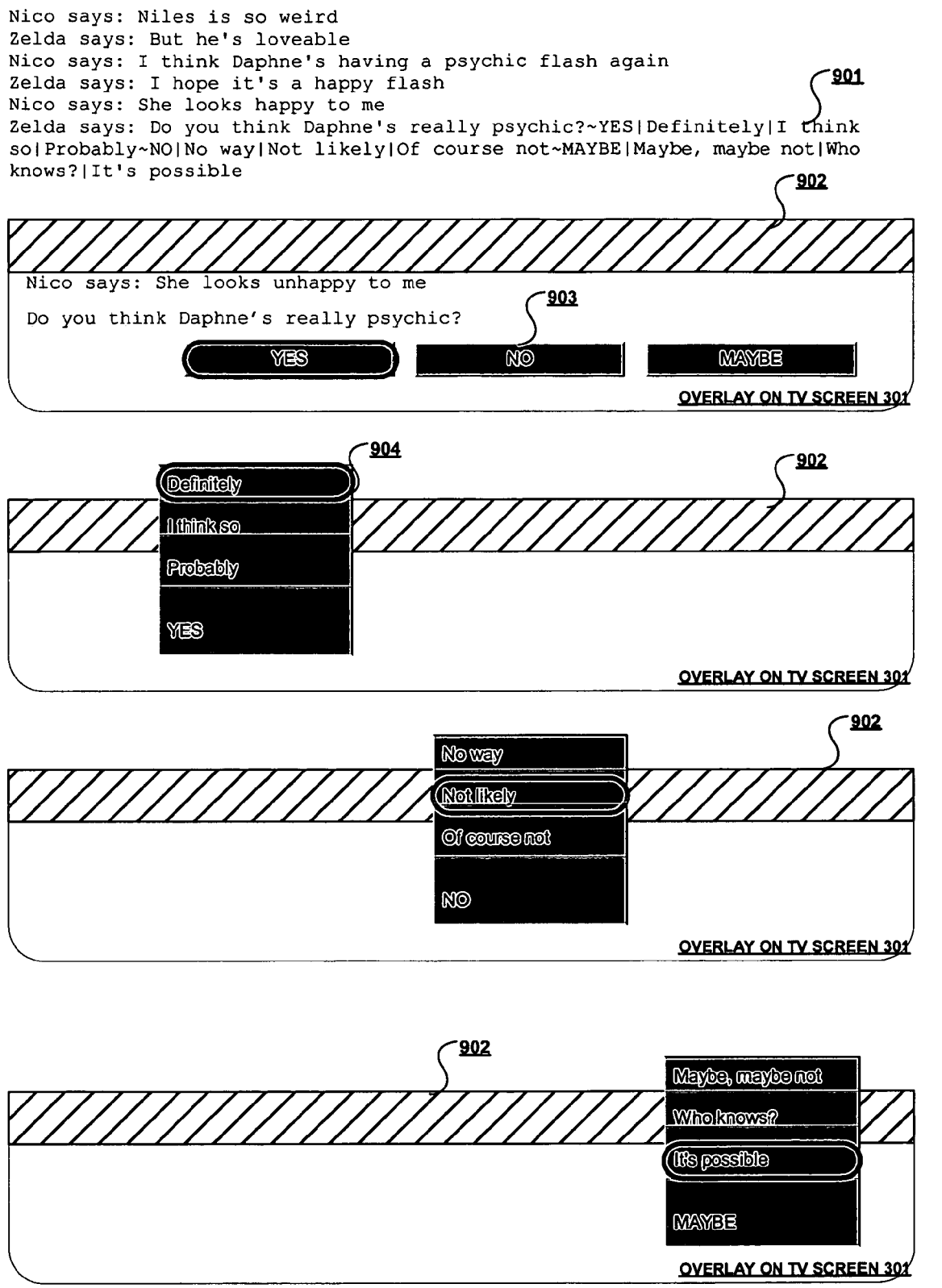
FIG. 9 illustrates a transcript with offered responses and how they an be displayed in accordance with an aspect of the invention.
Figure 10:
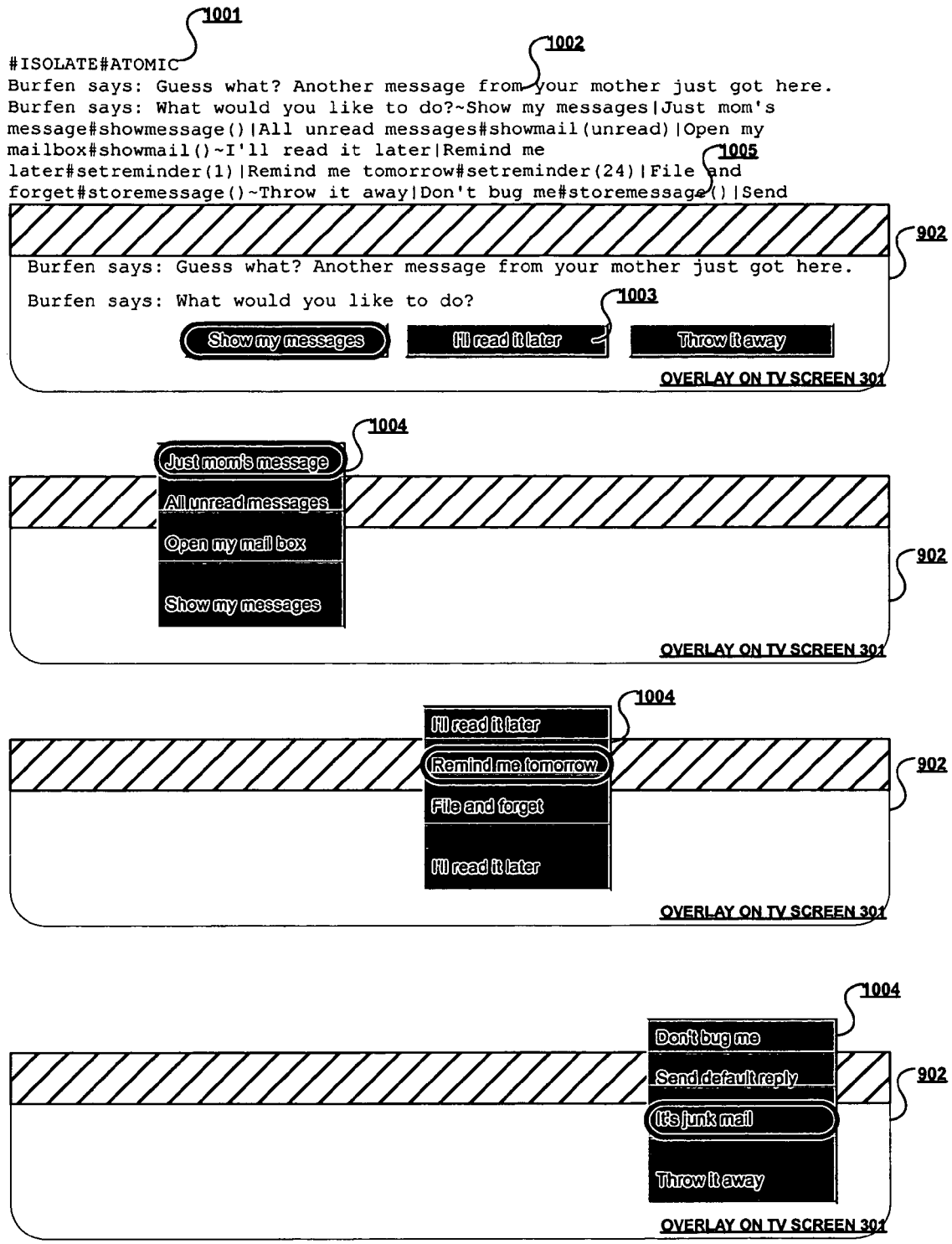
FIG. 10 illustrates a transcript with embedded directives, offered responses and associated executable functions in accordance with an aspect of the invention.

Transcripts that may be triggered by ATVEF triggers 305 embedded in the enhanced television broadcast 6. Such a trigger may indicate the start of a particular television show or advertisement—transcripts triggered in this way can provide supplemental interactive entertainment as illustrated in FIG. 9 and/or information pertaining to the broadcast. Other events that may trigger transcript playback include events associated with other applications (such as a messaging [email], as illustrated in FIG. 10 or personal information manager [PIM] application). It is important to note that FIG. 9 and FIG. 10 static snapshots of a continuous dialog (chat) experience.

Transcripts, illustrated in FIG. 9 and FIG. 10, consist of a sequence of items—dialog 1002, offered responses 901, and directives 1001. FIG. 9 shows a transcript that describes a conversation between "Nico" and "Zelda" and ends with a Click Chat™ message 901. The string format shown in FIG. 9 is the one used in the current embodiment—the format specifies separators between Click Chat™ groupings and their items 901 (in this case, the tilde and vertical bar character), a token used to introduce directives 1001 (the hash character). All other items are treated as dialog. In general, and frequently to accommodate international fonts and non-European languages, any format that identifies an offered response 901, a directive 1001 to the Future Radio™ client 303, and dialog in the chat stream 1002 (or pre-authored transcript) can be readily constructed by someone familiar with the art. FIG. 9 illustrates how an offered response 901, is overlaid on the television screen 902 of the television 301 and presented to the viewer. In this embodiment, buttons 903 are used to represent the groupings.

In an alternative presentation of the same transcript, (TV Chat™, noted earlier, is a multi-mode interface) the dialog is not overlaid the current television show but is presented alongside a "window" containing the television broadcast. The viewer utilizes remote control 309 (or any other selection device) to select an item 904. FIG. 10 illustrates directives 1001 included in a transcript for processing by the Future Radio™ client program illustrated in FIG. 6. Offered responses are processed by the JavaScript of the interface FIG. 7. In this embodiment, the JavaScript obtains the dialog 701 for display and the query to determine if the current dialog has an associated offered response 702 (Click Chat™) from the TV Chat™ API responsible for managing the TV Chat™ buffer 507.

Figure 6:
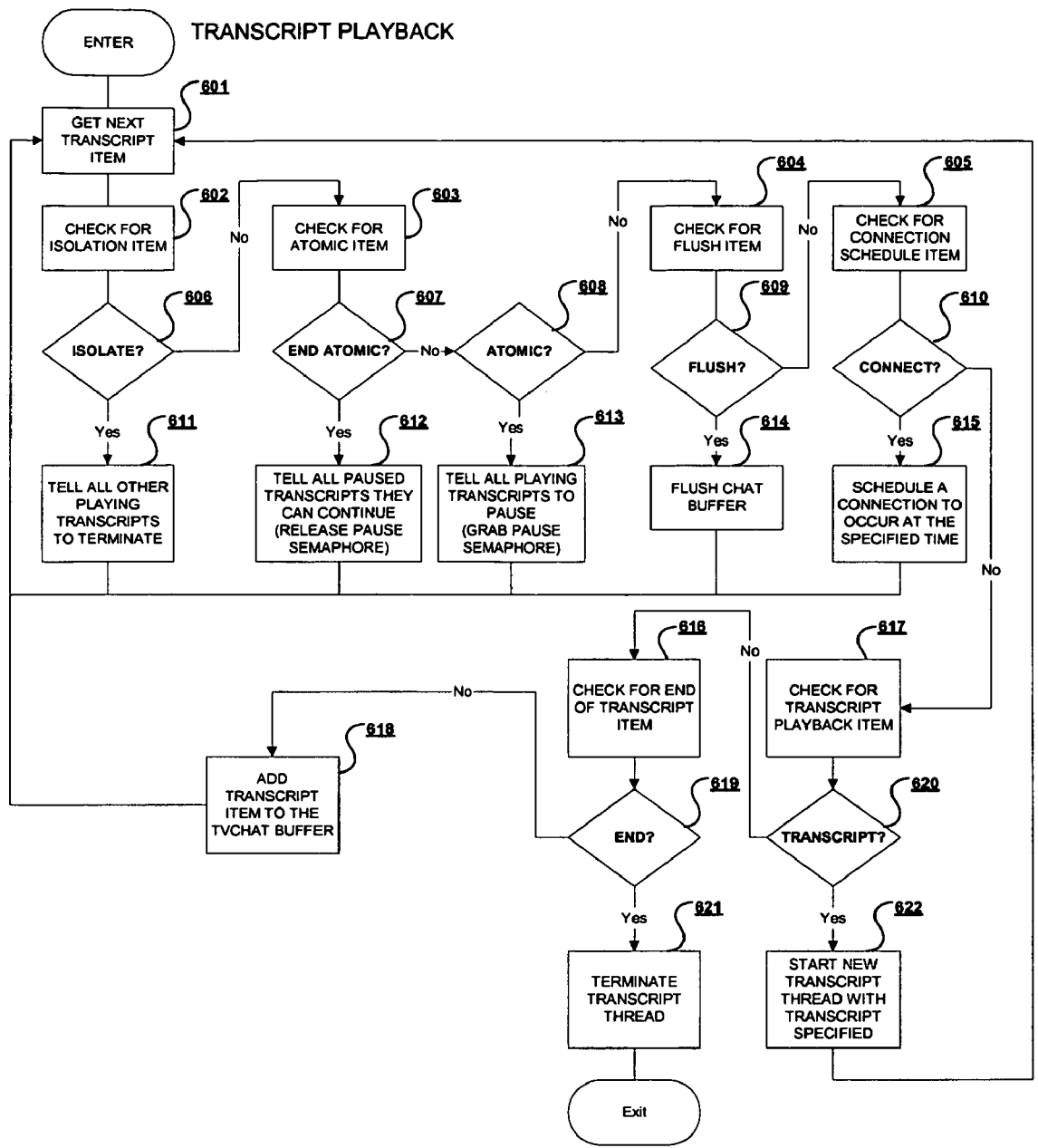
FIG. 6 is a flow diagram illustrating a routine for transcript playback in accordance with an aspect of the invention.
Figure 7:
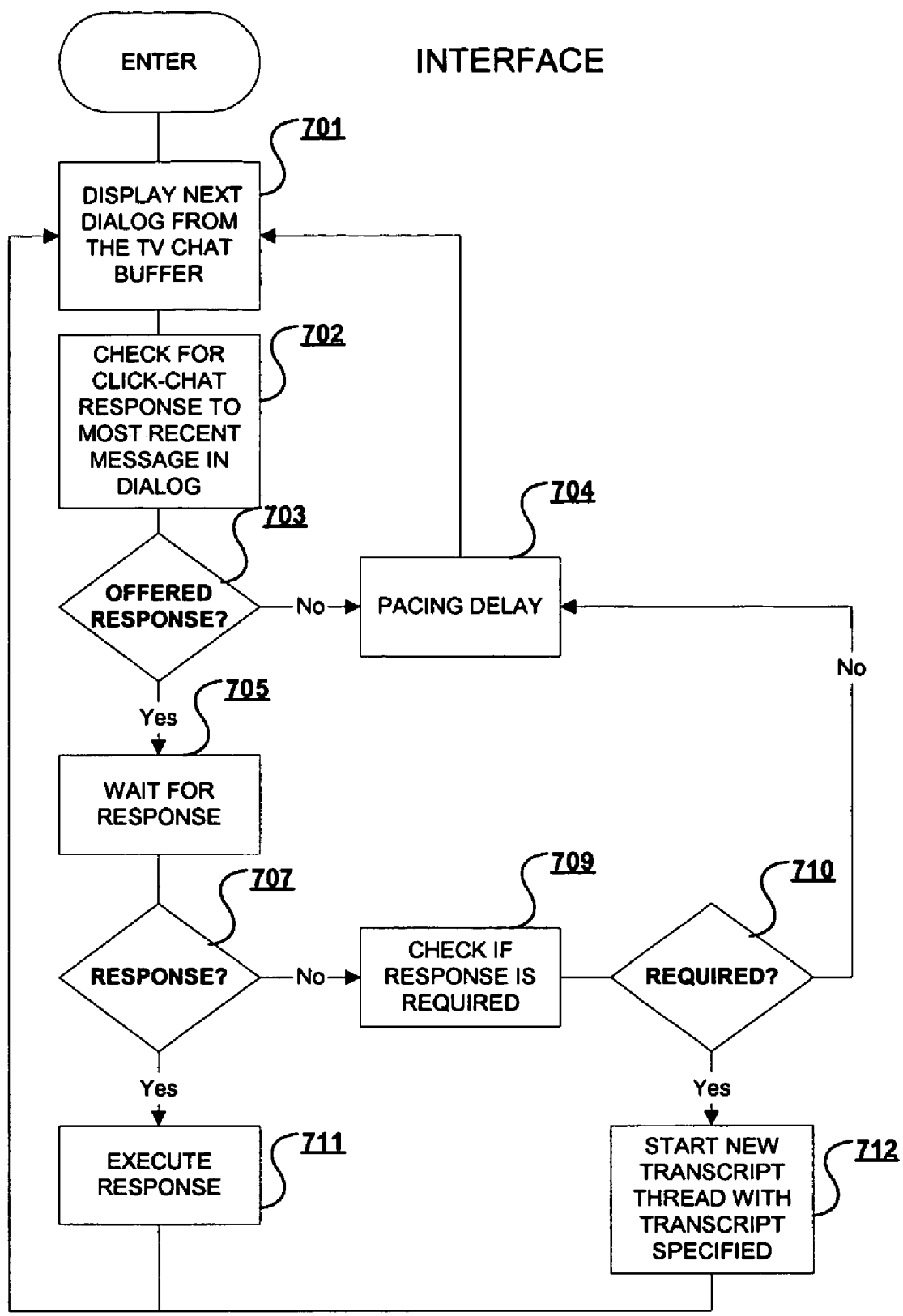
FIG. 7 is a flow diagram illustrating a routine for displaying transcripts, waiting for offered responses and executing them and checking if the failure of a response requires the execution of a further transcript in accordance with an aspect of the invention.

FIG. 6 illustrates how transcript items are processed. Each item is fetched 601 and parsed for directives that isolate a transcript 602, 611 (deletes all other transcripts), makes a transcript atomic 607, 612, 608, 613 (causes the transcript to pause all other transcripts and prevent any new transcripts from proceeding until it completes), to flush the chat buffer 609 (delete all historical dialog), schedule a connection 610, 615 (cause a connection to the network to be established at a later time to enable the reception of a broadcast chat from the broadcast chat server 804, or to enable a live connection to the chat server 804). Connection schedules are stored in a list of scheduled connections 505 that cause the Future Radio™ client 30 ensure a connection to the Internet is established and an associated transcript is executed.

Transcripts are run as threads, processing entities well known to someone familiar with the art, under the Windows CE® operating system. FIG. 6 illustrates the function of a transcript playback thread. Dialog is added to the TV Chat™ buffer 507 and subsequently displayed by the interface illustrated in FIG. 7. The interface checks for offered responses 702 and if a response is received, 707 executes the response 711. The response 711 will be stored in deferred response storage 502 if the box 303 is not connected to the Internet 3. Any JavaScript function associated with the response e.g., as shown 1005, will also be executed.

The Microsoft TV® platform and service in this embodiment typically maintains schedule 504 for client application storage, including 501, 502, 503, to be updated with its supporting services (of which Future Radio™ is one) during the early hours of the morning. Updates can generally be performed at any time at either the viewer's request or at an application's request. These updates synchronize the application stores 501, 502 on the client 303 with application storage on the server 5, 805 causing transcripts to be propagated to the clients and deferred responses to be propagated to the Future Radio™ server 5. Transcripts sent to the box 1 during these updates are played back when triggered by various triggers in broadcast content, transcripts, and applications. In another embodiment of the invention, triggers are associated with other content such as HTML pages available on the Internet and in local store.

TV Database 503 contains data related to the schedule of content programming, metadata associated with that content, and affinity associations, and is accessible to transcript processing that can include data from the TV Database 503 or utilize the information in the database in its processing 505 to identify Future Radio™ service events that are scheduled with content.

Application Overview

In one embodiment of the invention, Chattercast™ is an interactive contextual chat experience concurrent with television programming. Chattercast™ contextual dialogue enhances program sponsorship and paid advertising, is designed to enhance the viewer's TV viewing experience and works both online and offline. Viewers, using only a remote control to respond, are led down a path of interactive dialogue that prepares them for interaction with the show's producers, advertisers and sponsors.

Chattercast™ dialogue is a combination of pre-scripted and real-time chat—dialogue is delivered to Microsoft TV® clients before it is required. Triggered mass responses (for example, to advertising) are collected on a deferred basis.

In a fuller embodiment, Future Radio™ produces and authors a mix of live and pre-scripted dialog for the purpose of delivering a social interface to community, entertainment, information, services and applications that run concurrent to broadcast content.

Fictional characters developed by Future Radio™ dialog are supported by episodic stories presented in the available media—these stories may be presented using conventional television broadcast or an Internet based media. A fundamental problem facing attempts to build social interfaces for computers in the past has been how to make the interface compelling enough that the user will return habitually to use the agent as the interface to any given computer system. Our method adds depth to the social interface by providing a unique and evolving fictional universe in which the character "dwells." Character development remains plagued by the vagaries and talent of skilled human writers to provide compelling and stimulating fiction. However, Future Radio™ directs writers toward the development of characters that prove most successful as a social interface.

Viewers associate with the developed characters permitting Future Radio™ to develop affinity based categorization of content and services. Transcripts that represent a given character represent an "actor's voice" applying the well-known rules of theatre and elaborated on in the previously mentioned work of Nass and Reeves.

Future Radio™ can be implemented on a Multimedia Personal Computer where it becomes a desktop supplemental or replacement.

Future Radio™ transcripts frequently utilize the "Radio Talk Show" metaphor whereby viewers are mostly spectators and when they wish to contribute to the ongoing dialog "call in"—connect to the Future Radio™ server—and contributes dialog via a moderator (editor) that previews the dialog before it is broadcast. Thus the interaction stream can be broken down into "atomic" interactions whereby the viewer can finish the program and the character can give notification of new information. An example of how the dialog interacts with a viewer is in the presentation of second level content. Dialog of the character and viewer can continue concurrently with the dialog and program on screen. Dialog provides for the introduction of the advertisement. An advertisement can be displayed on the MMUI and character then can make comments about the content on the screen. This mechanism allows the viewer to become an active participant in the advertisement at their own choosing. The freedom to choose removes any subconscious or conscience sales pressure and enables a negotiation and a more personal connection to be made. The character can then continue dialogue with the viewer regarding the content and the advertisement content can be linked directory to the character's dialog. Chat can also refer to the advertisement where the user selects an icon expressing preferences for affinity group.

MMUI Comprising Characters Emblematic of Affinity Groups

In accordance with an aspect of the invention, a MMUI provides a plurality of affinity based categorizations, each categorization represented by a specific fictional character. Each character is emblematic of an affinity based category. The user then selects a particular character which he identifies with in accordance with the user's personal preferences and personality. The character that the user selects acts as a demographic filter, and scans incoming broadcast content and determines the programs or channels to be provided to the users selecting the character.

Figure 11:
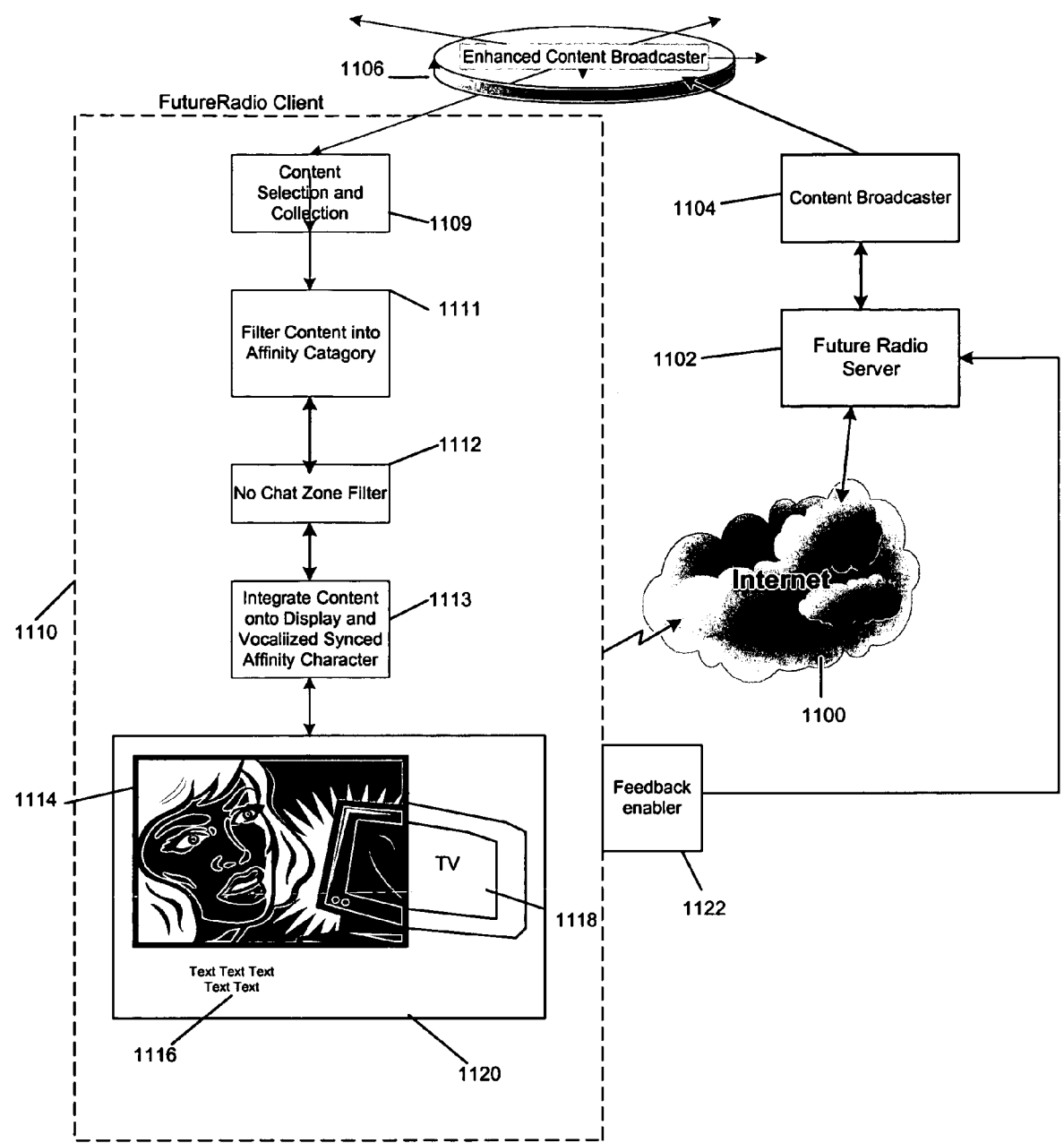
FIG. 11 illustrates the functional relationship of the affinity character in the Future Radio™ Client and Future Radio™ server architecture in accordance with an aspect of the invention.

Referring to FIG. 11, Internet cloud 1100 represents all available content on the Internet and some broadcast TV content. This source of content is accessed by the Future Radio™ Server 1102 which also communicates bi-directionally with the Content Broadcaster 1104 using the available transmission media and standards. Content is received by the Enhanced Content Broadcaster 1106.

The Enhanced Content Broadcaster 1106 provided the Future Radio™ service after integrating the broadcast content using the enhanced television standard. The current standard used in the embodiment is the ATVEF standard, and enables the embedding of triggers in the broadcast by the Content Broadcaster in real-time or in advance of content type triggers. The Future Radio™ service is then available to Future Radio™ clients 1110.

Further referring to FIG. 11, a plurality of affinity group characters 1114 are displayed to a Future Radio™ client 1110 on a multimedia display 1120. The user then selects a particular affinity group character which he identifies with based upon the user's own preferences and personality. The selected affinity group character is then displayed on the multimedia display 1120. Also shown on the display 1120 are the text 1116, enhanced TV content 1118 and any broadcast content. The selected character acts as a filter and scans incoming content by selecting channels, programming, or second level content for the viewer to watch. The affinity character also provides a simple and effective means for filtering and selecting programs to be recorded for later playback to a viewer. The content is naturally preferred by the user, because the selection of program content is based in accordance with the selected affinity group category and the predetermined preferences of the user that the affinity character represents.

The affinity group character acts as a demographic filter which optimizes the selection of content presented to a viewer. Each affinity group character represents a lifestyle, personality type, presentation style and corresponding broadcast content with which a user can identify. In accordance with an aspect of the invention, the selection of a particular affinity group character provides pre-selected broadcast content for real time or delayed recording and playback to a user.

The affinity group character facilitates the selection of internet content and broadcast content by exploiting the viewer's preferences. Each affinity group character is associated with a corresponding set of channels carrying specific broadcast content related to the lifestyle, personality, preferences or other characteristics represented by the affinity group character. The viewer's preferences are known by the viewer's selection of a particular character. Thus, broadcast content for a user can be pre-selected automatically through selection of a particular affinity group character. When different content appears in the character's universe of content, the interaction history of the affinity group character with a viewer can provide direction for selection of content based on prior indication of interest and non-interest in any particular area.

This aspect of the invention advantageously can create e-commerce opportunities as well as provide second level content tailored to a specific audience. This also provides the sponsor of programming content with crucial information concerning where to allocate advertising resources.

Examples of Second Level Content

It will be appreciated that an aspect of the invention significantly enhances e-commerce opportunities since the user identifies with and naturally wants to view and assimilate the content mediated through the corresponding affinity group character which the user has selected. This also establishes a virtual relationship between a viewer and the specific affinity character the viewer has selected from the list of affinity-based characters. Referring to FIG. 11, the affinity group characteristics filter 1111 filters the universe of broadcast content and information, taking only the programming, content or channels relevant to the selected affinity group. From the implementation point or view, the producer of each character makes an editorial decision about broadcast content that fits the character's affinity group. This provides e-commerce advantages, wherein the producer may bias or preferentially select content for mediation through the character on the basis of sponsorship. This content stream is then engaged with a regulation means 1112 which provides a means for switching information stream content from chat to commercial, called second level content, which can be directed by users.

For example, a user could select on a displayed feature of a female affinity group character to ascertain what brand of coat, lipstick, tooth paste, hair coloring, etc., the character is using or which appears on the screen. The response then could be displayed on the text portion 1116, vocalized by the affinity group character or displayed on TV 1118 portion with additional purchase or ordering information.

In accordance with an aspect of the invention, any item can be selected for secondary information. Note that the secondary information is mediated or filtered through the affinity group parameters and reflects the preferences and content of the selected affinity group and thus the user.

This advantageously enables program sponsors and advertisers to optimize advertising resources by directing advertising content to those viewers who are most likely to support the sponsors. Using methods that are well known, the sponsors also can determine the relative popularity of each affinity group character. In accordance with an aspect of the invention, the sponsors then can target the largest possible receptive viewer audience with advertising content by filtering that content through the most popular affinity group character.

For example, a viewer watching "Private Ryan" could select a feature such as a tank and activate a dialogue with the corresponding affinity group character concerning tank battles of World War II, such as El Alemain, Kursk-Orel and so forth. The affinity group character doesn't overly distract the viewer; he simply can register interest. The affinity character also can present second level content at a later time later for playback after it has been selected by user 1109. In this way, the affinity character acts a filter for mediating content based on a user's expressed interest. Future Radio™ characters would recognize viewer preferences and pass information on to content broadcasters for future display of content. From a service point of view, affinity group characters have popularity through use, which provides sponsors with valuable market and e commerce information.

In accordance with an aspect of the invention, an active feedback loop is provided at 1122 (FIG. 12) from the Future Radio™ Client 1110 to the Future Radio™ Server 1802. This provides a means for determining a viewer's personal preferences while securing the viewer's privacy. Tracking each affinity group character's popularity with multiple viewer's provides information about a viewer's preferences without the need to resort to record keeping on a user's interaction with his computer or other intrusive or covert means for gathering personal information. The aspect of gathering information about an audience by tracking the affinity group character's popularity provides a non invasive, non intrusive means to collect information on a user's needs and wants without having to collect, assemble, store and mine large databases to determine consumer needs and preferences.

Figure 12:
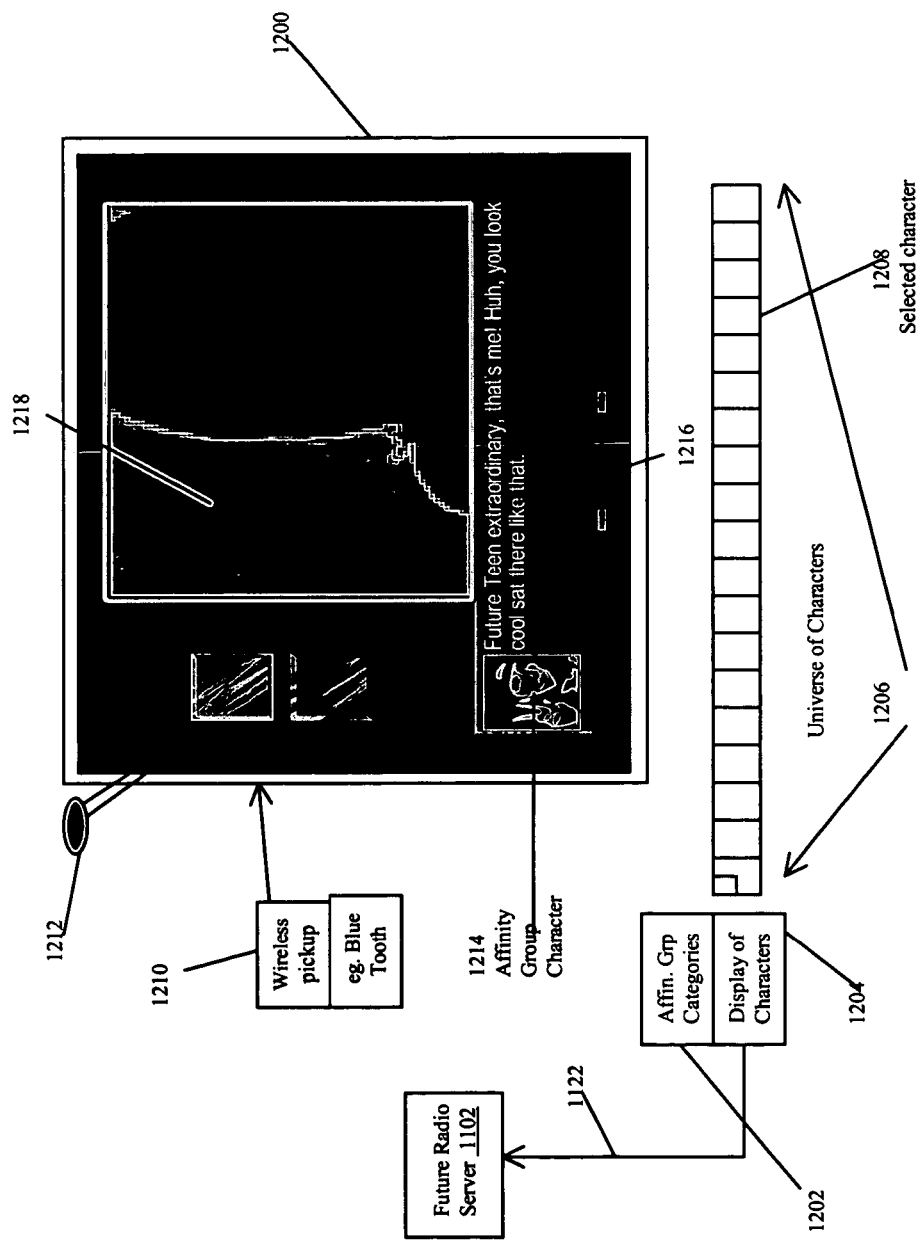
FIG. 12 illustrates an example of an affinity character multimedia user interface and its components in accordance with an aspect of the invention.

FIG. 12 illustrates an example affinity character multimedia user interface and its components. The affinity group categories 1202 can be displayed by many modes, one being a display button 1204 which unrolls a list or universe of characters 1206 from which a user can select a character emblematic of a particular affinity group. This can also be accomplished aurally via a wireless pickup 1210 using a wireless technology such as Blue Tooth. This adds to and extends the multimedia interface to other control devices. A microphone 1212 which will respond to voice commands can be used as well. A possible screen layout is shown at 1200 with the affinity character displayed in a smaller window 1214 on the upper right of the screen 1200. For example, when selecting a character associated with MTV®, (please note that MTV® is a registered trademark of Viacom) is displayed at 1218 on the major portion of the display screen with the text 1216 displayed on the bottom of the screen.

Feedback loop 1122 signals which affinity group characters are preferred. This provides a non-intrusive, non-invasive method of determining a character's popularity which is useful in determining not only users' preferred viewing content, but also producer, sponsor and advertiser content. The affinity character interface itself is provided with a means for storing each character's interactions with the user. Thus, it is the character's actions that are tracked, not the user, thereby protecting the user's privacy.

It can be appreciated that the affinity group character provides sponsor information and e-commerce opportunities with respect to a user without burdening the user with myriad choice overload. The facilitation works both ways, servicing the user's needs for entertainment and information without information overload or loss of privacy, while enabling producers, sponsors and market researchers to obtain valuable information concerning each demographic group associated with the selection of a specific affinity character.

While this invention has been described in connection with what are considered to be the most practical and preferred embodiments, it is to be understood that the invention is not limited to the disclosed embodiments, but on the contrary is intended to cover, various modifications and equivalent arrangements included within the spirit and scope of the appended claims.

For example, interaction between the viewer and the affinity group character can be spoken, initiated by a mouse click, or by any other convenient means of initiating communication. Therefore, persons of ordinary skill in this field are to understand that all such equivalent arrangements are included within the scope of the following claims.

We claim:

1. A method for selecting and presenting information to a user through an affinity based interface with one or more interactive interface characters, the method comprising:
   providing a plurality of interface characters that are displayed to a viewer and that are each emblematic of a corresponding affinity based categorization, the interface characters comprising interactive interface characters associated with presentation characteristics for interacting with the viewer and for engaging in dialog with the viewer;
   receiving input corresponding to a viewer selection of an interface character from the plurality of displayed interface characters;
   identifying content from a plurality of content sources;
   scanning and filtering the identified content to generate filtered content according to affinity based characteristics that are associated with the selected interface character; and
   using the interface character to present the filtered content to the viewer.

2. A method as recited in claim 1, wherein the interface character has a unique presentation style.

3. A method as recited in claim 2, wherein the presentation style of the interface character corresponds to a unique style of speech.

4. A method as recited in claim 1, wherein the interface character comprises selectable and distinct features that, when selected, initiate an interactive dialog between the interface character and the viewer.

5. A method as recited in claim 4, wherein the dialog presented to the viewer corresponds specifically to content displayed to the viewer.

6. A method as recited in claim 4, wherein the dialog presented to the viewer corresponds specifically to questions asked by the viewer to the interface character.

7. A method as recited in claim 4, wherein the identified content is filtered at least in part according to interactions between the interface character and the viewer, and wherein the interactions include dialogs communicated between the viewer and the interface character.

8. A method as recited in claim 1, wherein the dialog presented to the viewer includes a combination of pre-scripted and live chat dialog.

9. A method as recited in claim 8, wherein the chat dialog is contextually related to the identified content.

10. A method as recited in claim 1, wherein the interface character is displayed simultaneously along with a display of the filtered content to the viewer.

11. A method as recited in claim 1, wherein the identified content includes at least one of broadcast content or Internet content.

12. A method as recited in claim 1, further comprising:
    providing notifications to the viewer through the interface character.

13. A computer program product comprising one or more computer-readable storage media storing computer-executable software instructions which, when executed by a computing processor, implement the method recited in claim 1.

14. A method for selecting and presenting information to a user through an affinity based interface, the method comprising:
    providing a plurality of interface character personas that are displayed to a viewer, wherein each of the interface character personas is associated with a respective domain of preselected broadcast content;
    receiving input corresponding to a viewer selection of an interface character persona from the plurality of displayed interface character personas; and
    presenting the broadcast content associated with the selected interface character persona to the viewer, wherein the selected interface character persona comprises an interactive character persona that is associated with a chat mechanism that enables the interactive character persona to participate in an interactive chat dialog with the viewer.

15. A computer program product comprising one or more computer-readable storage media storing computer-executable software instructions which, when executed by a computing processor, implement the method recited in claim 14.

* * * * *